(12) United States Patent
Tomkins et al.

(10) Patent No.: US 8,497,842 B2
(45) Date of Patent: *Jul. 30, 2013

(54) SYSTEM HAVING USER INTERFACE USING MOTION BASED OBJECT SELECTION AND MOUSE MOVEMENT

(75) Inventors: Steve Tomkins, Ottawa (CA); Dan Dodge, Nepean (CA); Peter Van Der Veen, Ottawa (CA); Xiaodan Tang, Ottawa (CA); Colin Burgess, Ottawa (CA)

(73) Assignee: QNX Software Systems Limited, Kanata, Ontario (CA)

( * ) Notice: Subject to any disclaimer, the term of this patent is extended or adjusted under 35 U.S.C. 154(b) by 754 days.

This patent is subject to a terminal disclaimer.

(21) Appl. No.: 12/039,676

(22) Filed: Feb. 28, 2008

(65) Prior Publication Data
US 2009/0115736 A1 May 7, 2009

Related U.S. Application Data

(60) Provisional application No. 60/985,053, filed on Nov. 2, 2007.

(51) Int. Cl.
*G06F 3/041* (2006.01)

(52) U.S. Cl.
USPC .......................... 345/173; 345/156

(58) Field of Classification Search
USPC .................................. 345/156, 173
See application file for complete search history.

(56) References Cited

U.S. PATENT DOCUMENTS

| | | | | |
|---|---|---|---|---|
| 5,335,276 A | * | 8/1994 | Thompson et al. | 380/266 |
| 5,465,401 A | * | 11/1995 | Thompson | 455/558 |
| 6,192,255 B1 | * | 2/2001 | Lewis et al. | 455/558 |
| 6,707,449 B2 | * | 3/2004 | Hinckley et al. | 345/173 |
| 6,791,536 B2 | * | 9/2004 | Keely et al. | 345/173 |
| 6,892,359 B1 | | 5/2005 | Nason et al. | |
| 6,975,306 B2 | * | 12/2005 | Hinckley et al. | 345/173 |
| 7,362,358 B2 | * | 4/2008 | Nakayama | 348/229.1 |
| 7,382,358 B2 | * | 6/2008 | Kushler et al. | 345/168 |
| 7,797,630 B2 | * | 9/2010 | Kashi | 715/268 |

(Continued)

FOREIGN PATENT DOCUMENTS

EP  1 667 013  6/2006

OTHER PUBLICATIONS

Lei Wang et al., Design and Implementation of a Novel User Interface for Embedded Systems, International Symposium on the Intelligent Information Technology Application Workshops, pp. 247-250, IEEE 2008.

(Continued)

*Primary Examiner* — Bipin Shalwala
*Assistant Examiner* — Afroza Chowdhury
(74) *Attorney, Agent, or Firm* — Brinks Hofer Gilson & Lione

(57) ABSTRACT

A system includes a touchscreen display and an interface application. The interface application controls the touchscreen display to provide a container and a user interface control. The user interface control may be selected through manipulation of the touchscreen display in an area of the container proximate the user interface control. The user interface application identifies a user manipulation as a mouse movement in response to manipulation of the touchscreen display in an area of the container when the manipulation has a motion magnitude exceeding a threshold value.

26 Claims, 7 Drawing Sheets

U.S. PATENT DOCUMENTS

| | | | | |
|---|---|---|---|---|
| 8,073,196 | B2* | 12/2011 | Yuan et al. | 382/103 |
| 8,120,586 | B2* | 2/2012 | Hsu et al. | 345/173 |
| 8,334,847 | B2* | 12/2012 | Tomkins | 345/173 |
| 2005/0052458 | A1* | 3/2005 | Lambert | 345/440 |
| 2005/0110964 | A1* | 5/2005 | Bell et al. | 353/122 |
| 2006/0242592 | A1* | 10/2006 | Edwards et al. | 715/764 |
| 2007/0124503 | A1* | 5/2007 | Ramos et al. | 709/248 |
| 2008/0082907 | A1 | 4/2008 | Sorotokin et al. | |
| 2008/0110964 | A1* | 5/2008 | Churvis | 229/100 |
| 2008/0126387 | A1* | 5/2008 | Blinnikka | 707/102 |
| 2008/0316183 | A1* | 12/2008 | Westerman et al. | 345/173 |
| 2009/0046110 | A1 | 2/2009 | Sadler et al. | |
| 2009/0048110 | A1* | 2/2009 | Bakker | 504/241 |
| 2009/0102806 | A1* | 4/2009 | Tomkins | 345/173 |
| 2009/0232367 | A1* | 9/2009 | Shinzaki | 382/124 |

OTHER PUBLICATIONS

International Search Report from International Application No. PCT/IB2009/006515, dated Feb. 26, 2010.

International Preliminary Report on Patentability from corresponding international application No. PCT/IB2009/006515, 10pgs, dated Feb. 24, 2011.

* cited by examiner

US 8,497,842 B2

SYSTEM HAVING USER INTERFACE USING MOTION BASED OBJECT SELECTION AND MOUSE MOVEMENT

CROSS-REFERENCE TO RELATED APPLICATIONS

The present application claims priority from U.S. Provisional Patent Application No. 60/985,053, filed Nov. 2, 2007.

BACKGROUND OF THE INVENTION

1. Technical Field

The present invention relates to a user interface and, more particularly, to a system having a user interface using object selection and gestures to interface with a user.

2. Related Art

Processor-based devices are used in a wide range of applications. MP3 players play audio from stored media content. Video players may display streaming video from a memory storage device, a private network, and/or the Internet. Cellular phones may display streaming video from a memory storage device, a private network, the Internet, and/or another cellular phone subscriber.

Such devices may have an interface to facilitate interaction with the various functions that it offers. The interface may include a hardwired interface and/or a virtual interface. Hardwired interfaces may include pushbutton switches, rotary switches/potentiometers, sliders, and other mechanical elements. Virtual interfaces may include virtual buttons, virtual sliders, virtual rotator controls, function identifiers, and other visual elements. In a combined interface, function identifiers may be positioned on a display adjacent corresponding mechanical based items, such as switches.

The development of a virtual interface may become complicated when the interface displays controls and/or images associated with many functions. The number of controls and/or images generated may result in a crowded display. Display crowding may make it difficult for the user to select displayed objects associated with these functions due to their close proximity with one another.

SUMMARY

A system includes a touchscreen display and an interface application. The interface application controls the touchscreen display to provide a container and a user interface control. The user interface control may be selected through manipulation of the touchscreen display in an area of the container proximate the user interface control. The user interface application identifies a user manipulation as a mouse movement in response to manipulation of the touchscreen display in an area of the container when the manipulation has a motion magnitude exceeding a threshold value.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
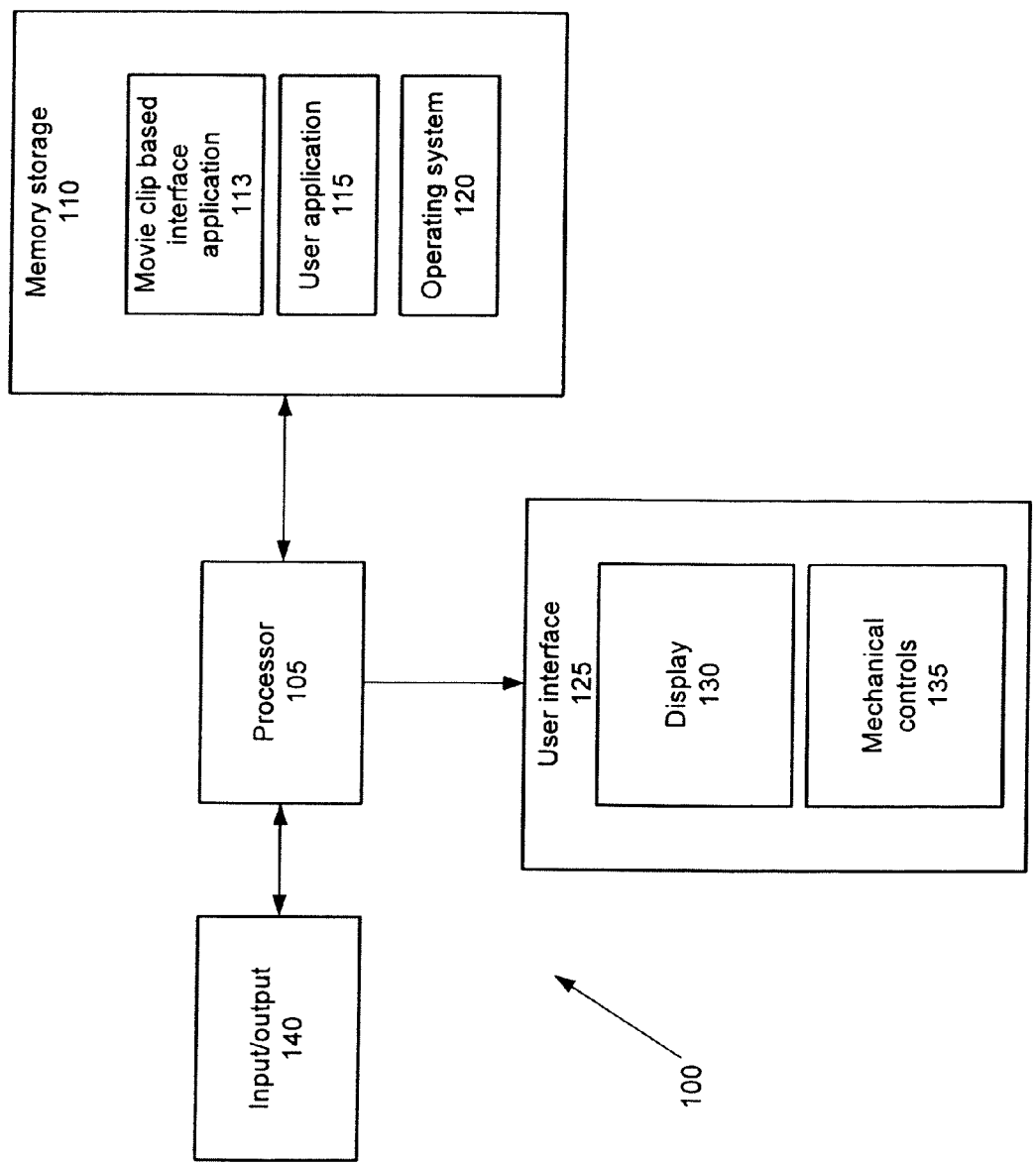
FIG. 1 is a system that includes a user interface that uses both object selection and user gestures on a touchscreen display to execute corresponding functions.

FIG. 1 shows a system 100 that includes a user interface that may use object selection and user gestures on a touchscreen display to execute corresponding functions. System 100 includes a processor 105 that may interface with a local or remote memory storage 110. Memory storage may include a movie clip based interface application 113, one or more user applications 115, and an operating system 120. The movie clip based interface application 113 may be executable by the processor 105 and determines how a user interacts with system 100 through user interface 125. It may be implemented as a FLASH® player and include corresponding ActionScript® programming. User interface 125 may include a display 130, such as a touchscreen display, and/or mechanical controls 135.

Processor 105 may also interact with other components through one or more input/output interfaces 140. Input/output interfaces 140 may include an Internet gateway, WiFi transceiver, imaging device, USB interface, FireWire interface, an MP3 decoder, DVD decoder or player, a receiver, and/or other input and/or output device.

Figure 2:
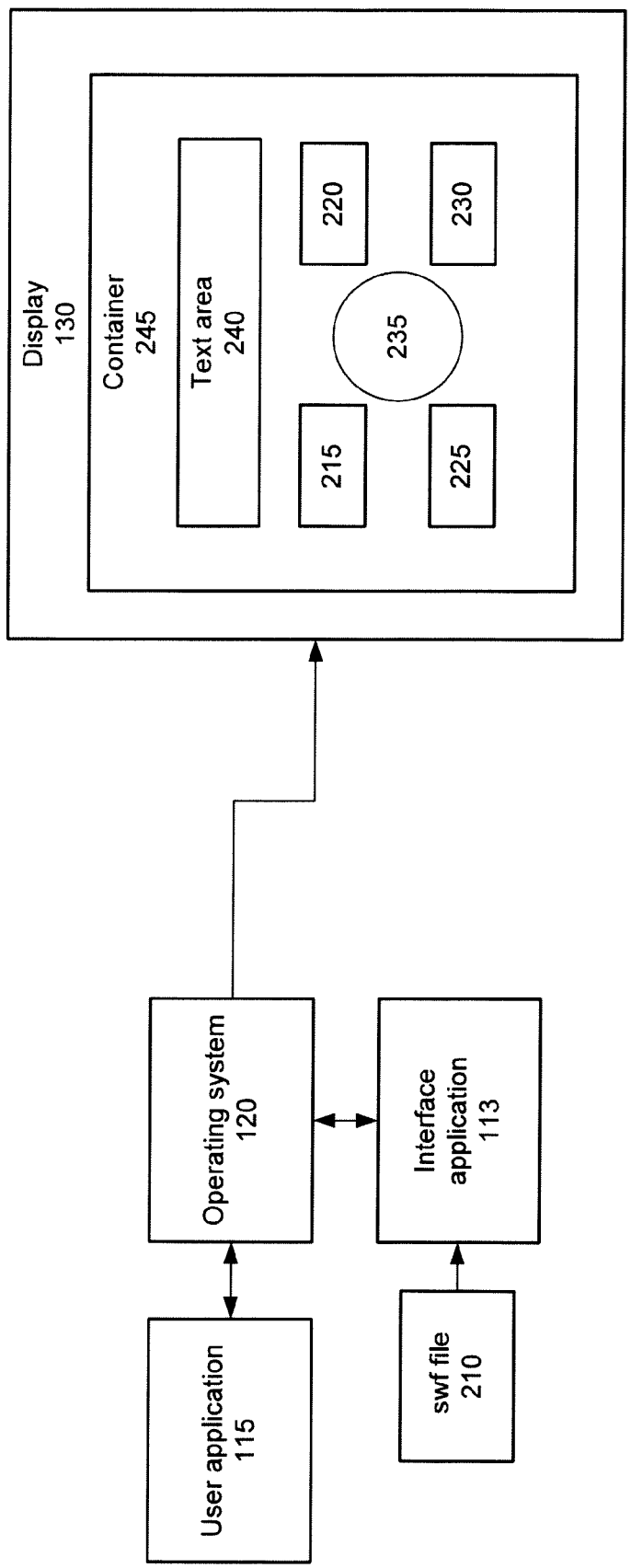
FIG. 2 shows how components of FIG. 1 interact with and control the display of the user interface.

FIG. 2 shows how the components of FIG. 1 may interact with and control the display 130 of user interface 125. In FIG. 2, the movie clip based interface application 113 may interact with display 130 operating system 120. Interface application 13 may be a movie clip based application, such as a FLASH® player that is adapted to play a compressed a vector format object such as an .swf file 210. The .swf file 210 may include various movie clip based controls employed by the user interface 125.

The interface application 113 may provide controls, such as movie clip based controls, for output on display 130 to implement a virtual interface. These controls may be arranged on the display 130 according to the interface application 113. In FIG. 2, the movie based clips include controls 215, 220, 225, 230, and 235, and may be selectable objects. A text area 240 may be provided to display input and/or output text. Additionally, or in the alternative, text area 240 may be replaced by or supplemented with an image display area that may be used to display images, such as still images, animations, and/or video. Controls 215 through 235 and text area 240 may be arranged within a container 245, such as a movie clip container in a FLASH® player environment. A set of movie based clip controls may be used to implement a keyboard, such as a complete QWERTY, to provide a set of text characters that allow the user to enter text information.

Figure 3:
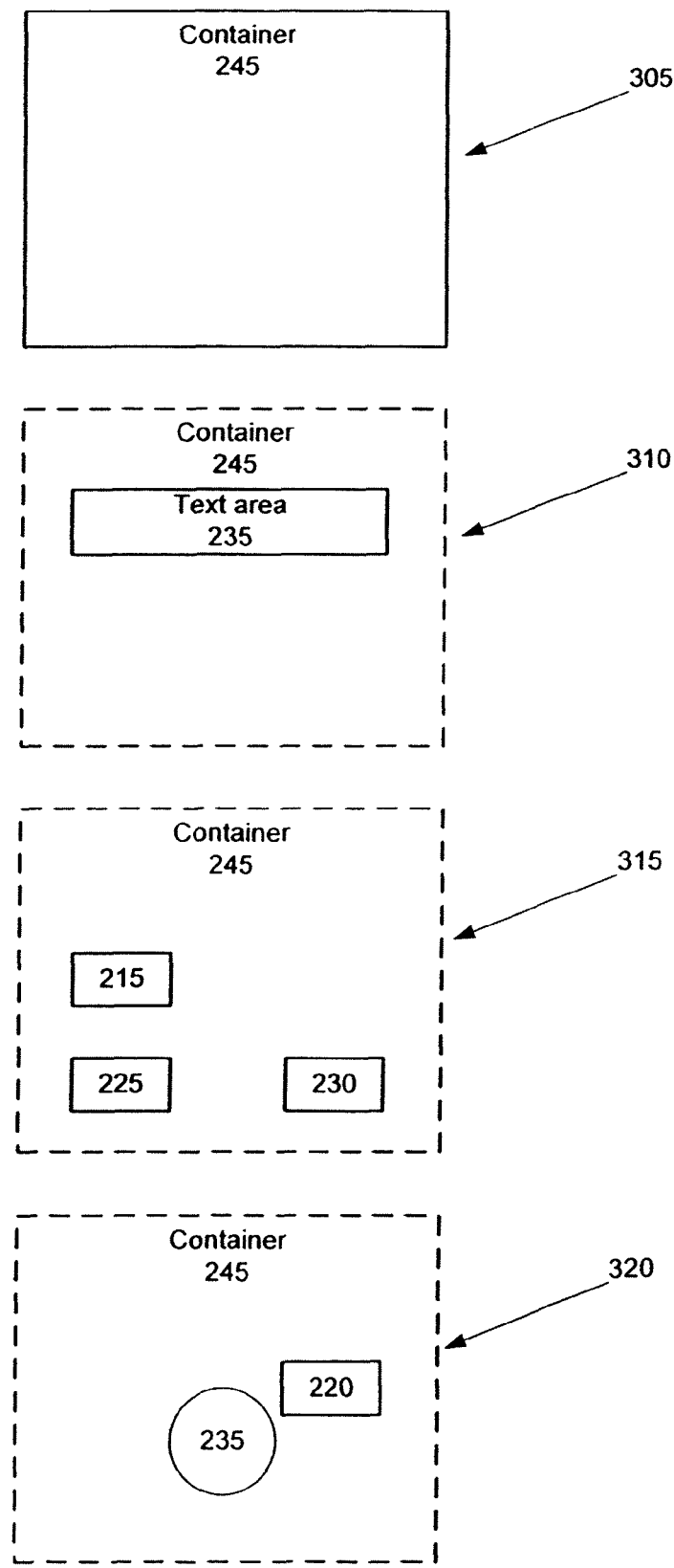
FIG. 3 is a multilayer arrangement of the objects of the user interface with respect to a container.

FIG. 3 shows a multilayer arrangement of the various objects of the user interface with respect to container 245. In FIG. 3, container 245 may be disposed on a first display layer 305. Text area 235 may be disposed in the area of container 245 on a second display layer 310. Selectable controls 215, 225, and 230, may be disposed in the area of container 245 on a third display layer 310. Selectable controls 230 and 235 may be disposed in the area of container 245 on a fourth layer 310. One or more of the selectable controls 215 through 235 may overlap one another on different layers of the multilayer arrangement. Alternatively, or in addition, the selectable controls 215 through 235 may be disposed on the same layer of the arrangement in a non-overlapping configuration. Layers may be visible or translucent (e.g., invisible).

Figure 4:
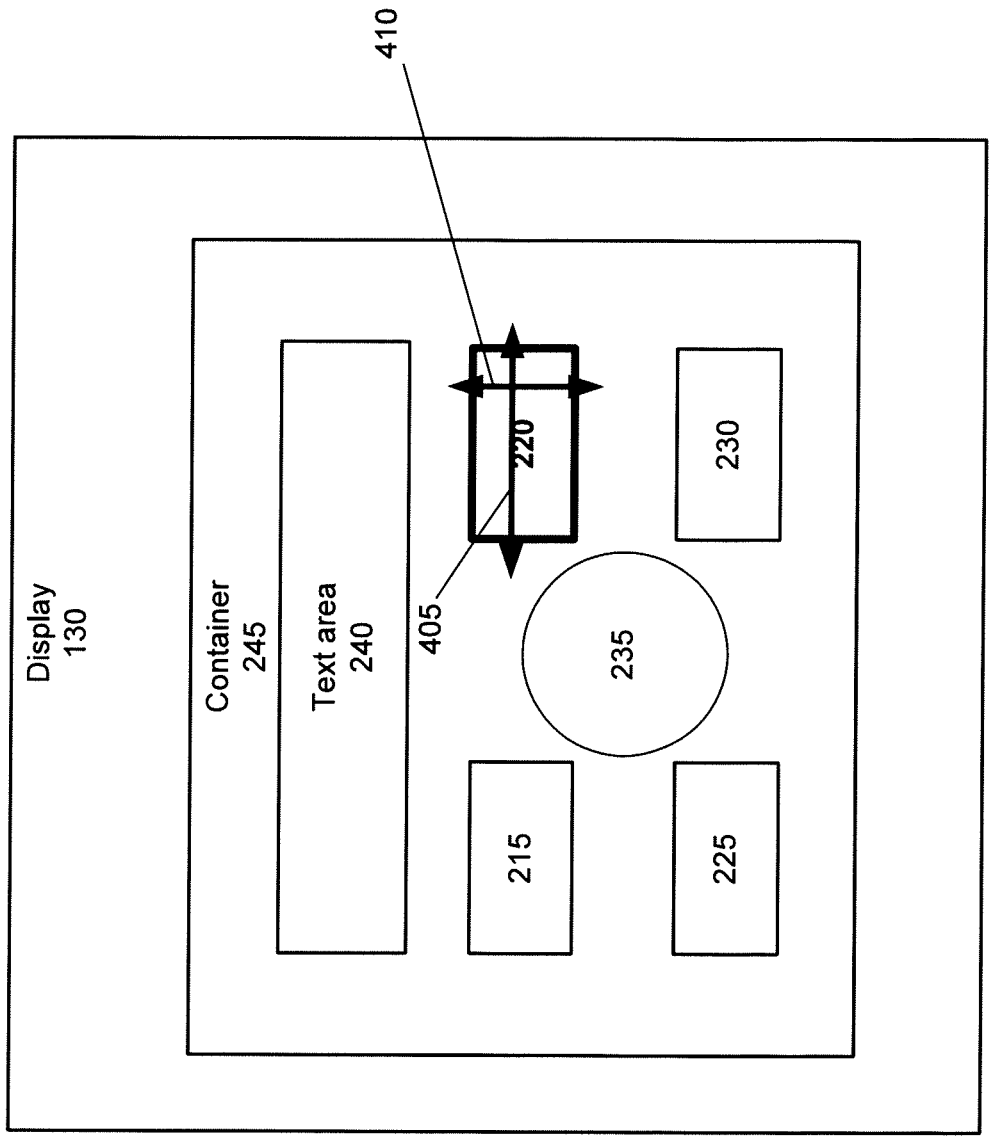
FIG. 4 shows manipulation of the touchscreen display to select an object or control.

FIG. 4 illustrates manipulation of the touchscreen display 130 to select an object/control. In FIG. 4, selection of control 210 is shown. To select control 210, the user may touch the touchscreen display 130 in an area proximate control 210 and within the boundaries formed by arrows 405 and 410. The interface application 113 may identify the manipulation as selection of object 210 when the magnitude of any motion of the manipulation is below a threshold value. The magnitude of the motion may be determined by the difference between the coordinates on the touchscreen display at which the manipulation begins and the coordinates at which the manipulation ends. These coordinates may be obtained by measuring the motion in the container 245. In a FLASH® environment, the magnitude of the motion may be determined using an ActionScript® routine associated with the container 245.

When the magnitude of the motion is below the threshold value on display level 305 having the container 245, the interface application 113 may execute a hierarchical search of the levels within the container area to determine whether the user has attempted to select an object. The hierarchical search may involve looking through the layers in the area bounded by arrows 405 and 410. If the layers are arranged in a manner shown in FIG. 3, the search may end at layer 320, which includes the selectable control 220.

If a selectable control is found in the area bounded by arrows 405 and 410, the interface application 113 may communicate with the operating system 120 to execute the function associated with the selectable control, such as entry of a corresponding text character. In FIG. 2, the interface application 113 may communicate with the user application 115 through the operating system 120. Additionally, or in the alternative, the interface application 113 may itself execute the function associated with the selectable control automatically.

Figure 5:
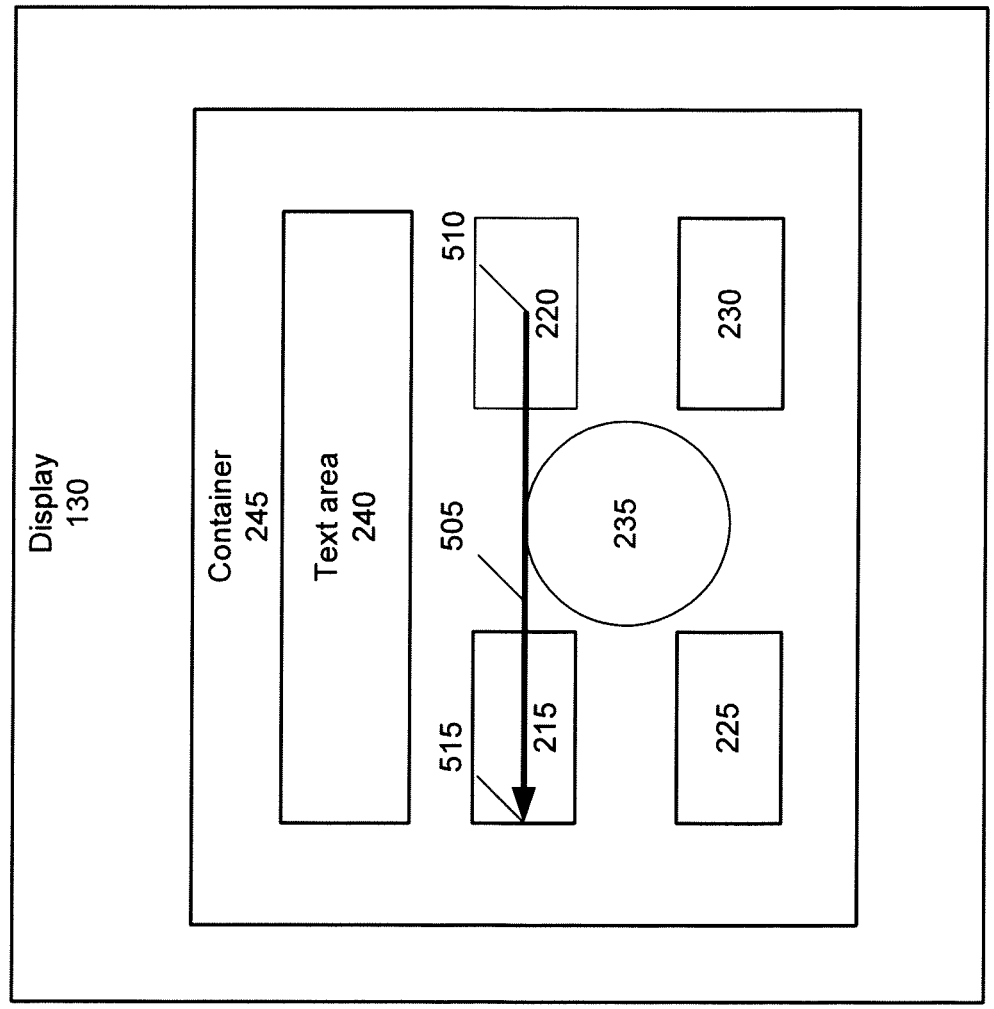
FIG. 5 shows manipulation of the touchscreen display to generate a mouse movement.

FIG. 5 illustrates manipulation of the touchscreen display 130 to generate a mouse motion that may be identified by the interface application 113 to execute a corresponding mouse movement. In FIG. 5, the user executes a gesture designated by arrow 505. The gesture 505 starts when the user presses the touchscreen display at 510 and discontinues pressing the touchscreen at 515. The interface application 113 determines the magnitude of this motion using the start location 510 and end location 515 of the gesture 505. If the magnitude of this motion exceeds the threshold value, the interface application 113 may treat the manipulation as a mouse movement.

Figure 6:
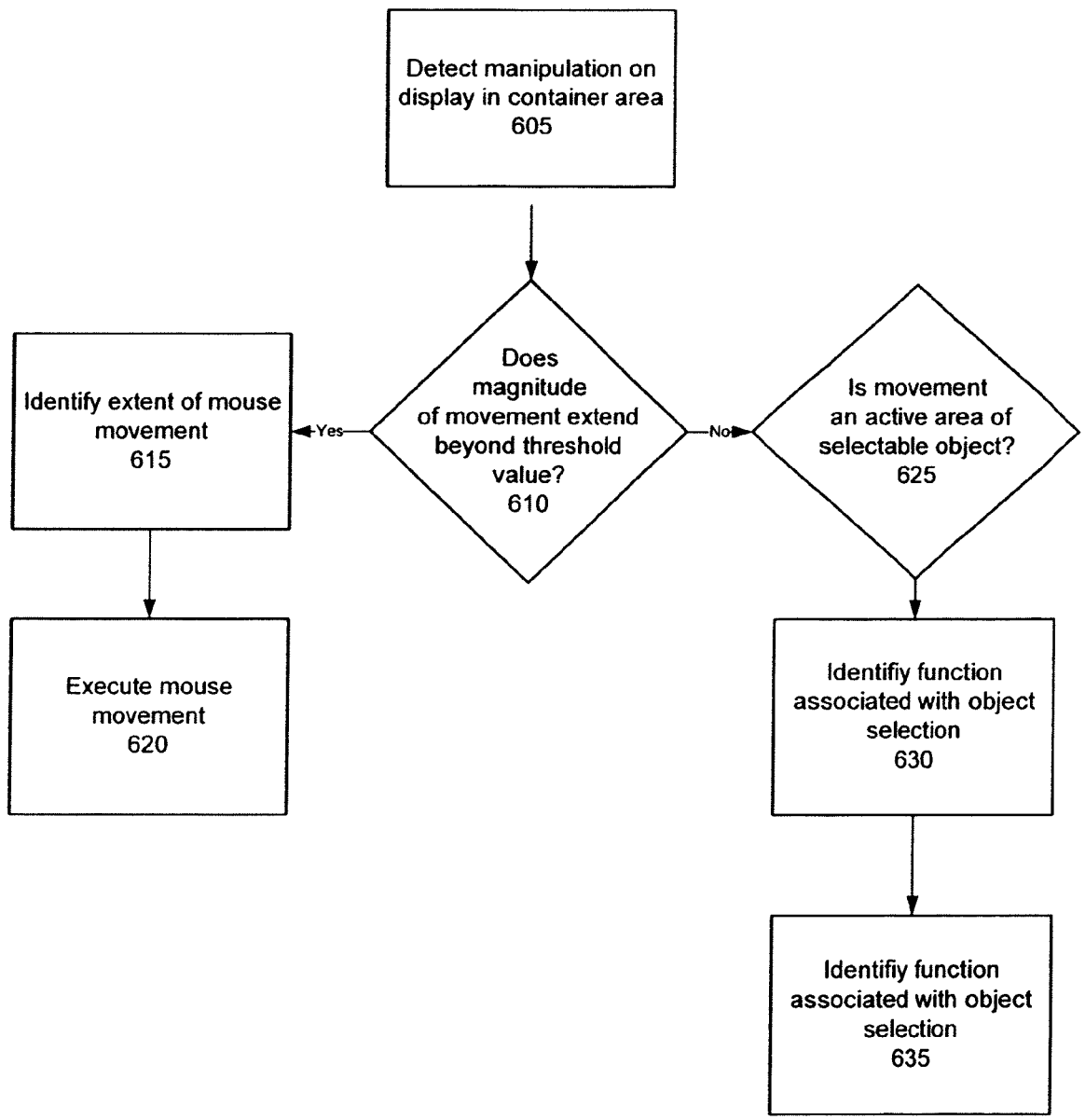
FIG. 6 is a process used to implement a user interface having selectable objects and mouse movement functionality.

FIG. 6 illustrates operations used to implement a user interface having selectable objects and mouse movement functionality. At 605, manipulation on the display in the area of a container having one or more selectable objects, such as one or more movie clips, is detected. The magnitude of the movement of the manipulation is compared to a threshold value at 610. If the magnitude exceeds the threshold value, the motion is interpreted as mouse movement at 615 and the corresponding mouse motion is executed at 615. If the magnitude of the motion does not extend beyond the threshold value, an operation is executed at 625 to determine whether the manipulation was proximate an active area of a selectable object. If it was in such an active area, the function associated with the object selection, such as selection of a text character from a keyboard, is identified at 630 and executed at 635. The object selection and/or mouse gesture determinations and executions may be performed by software, hardware, or a combination of both.

Figure 7:
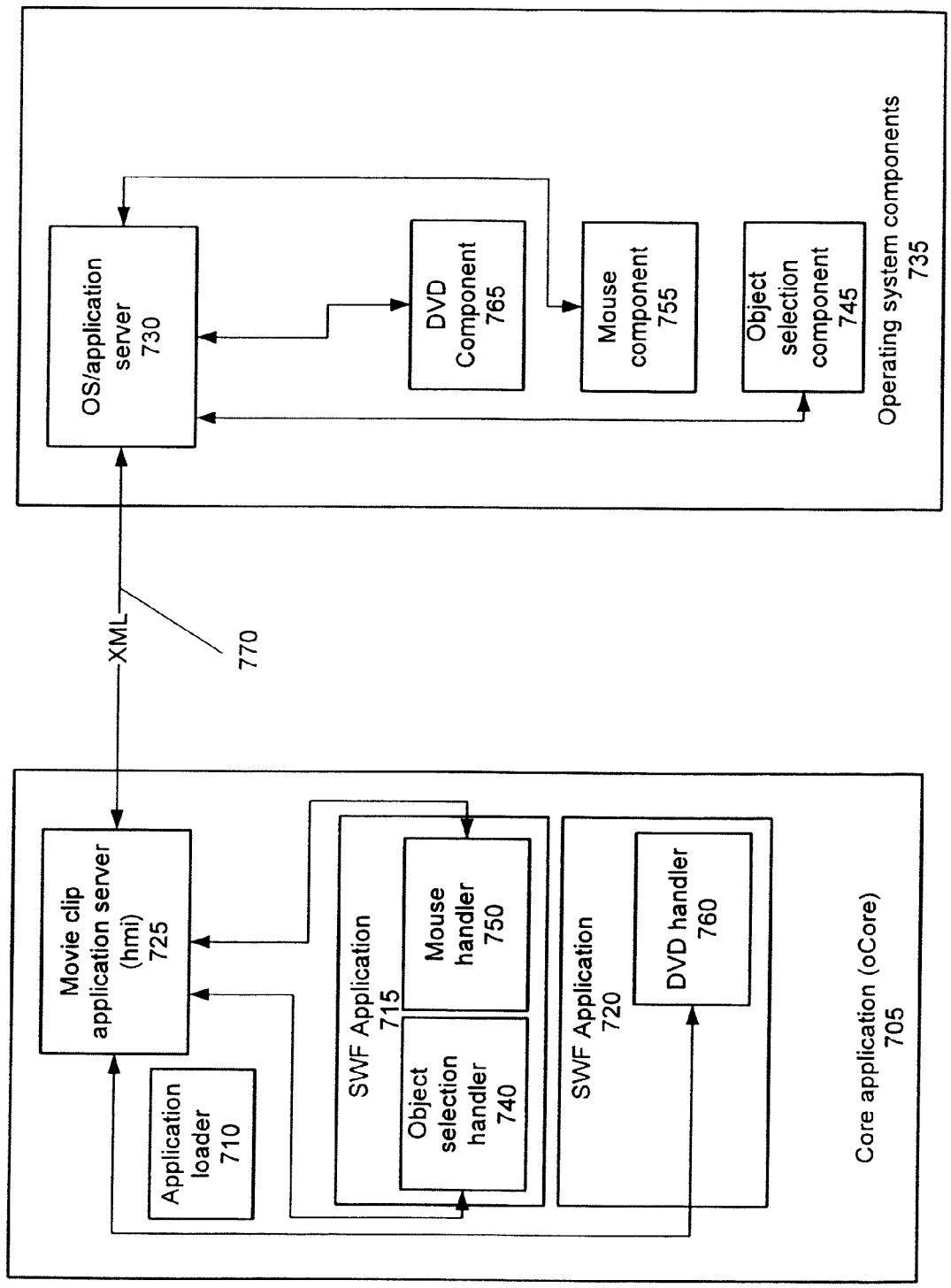
FIG. 7 shows a movie clip based application communicating with an operating system.

FIG. 7 illustrates how a movie clip based application may communicate with an operating system. The movie clip based application may include a core application 705 and a plurality of instantiated software classes. If the movie clip based application is implemented in a FLASH® environment, the software classes may be implemented using ActionScript®.

In FIG. 7, an instance of an application loader class 710 may be used to load a first movie clip based application 715 and a second movie clip based application 720. The application loader 710 may include the following methods:

```
app_mc = loadApp ( mc, filename, delayunload, lockroot );
getCurrentApp( );
getPreviousApp( );
unloadPreviousApp( );
res_mc = loadResidentApp( mc, filename, appname );
unloadResidentApp( appname );
getResidentApp( appname );
addInterval( interval );
removeInterval( interval );
```

Additionally, the application loader 710 may dispatch the following events:

```
exitCleanUp (Function call)
   Allows the current application to cleanup (remove intervals, listeners,
   etc) before loading a new application.
appLoaded/resLoaded
   Used for application transitions and/or application setup/config here
appError/resError
   Called if an application fails to load
```

A movie clip application server 725 may be used to communicate with a corresponding operating system server 730 included as one of a plurality of operating system components 735. The movie clip application server 725 may also communicate with one or more component handlers associated with applications 715 and 720. The component handlers may be responsible for communicating commands and handling events associated with corresponding operating system components. In FIG. 7, application 715 includes an object selection handler 740 for communicating commands and handling events associated with an object selection component 745, and a mouse handler 750 for communicating commands and handling events associated with mouse component 755. The object selection component 745 may manage keyboard entries detected by application 715 and execute any corresponding functionality. The mouse component 765 may manage mouse movement entries detected by application 715 and execute any corresponding functionality. Additionally, multiple taps by the user on the display 130 within a predetermined time may be interpreted as a selection command and handled by the mouse component 765.

Application 720 includes a DVD handler 760 for communicating commands and handling events associated with DVD component 765. The DVD component 765 may control a DVD player that runs as a stand-alone application in the operating system. It may be used to display DVD video at a certain screen position that may be defined by application 715 through DVD handler 760. Additionally, the DVD component 765 may respond to DVD player commands (e.g., play, fast-forward, reverse, volume, forward chapter, reverse chapter, or other command) provided by application 715 through DVD handler 760.

The component handlers of the core application 705 are attached for communication with the movie clip application server 725. The following code may be used in attaching the handlers shown in FIG. 7:

```
Object Selection Handler Example
objsel=
OBJSELHandler( oCore.hmi.checkHandler(OBJSELHandler.HTYPE ) );
if ( objsel== null ) {
    objsel = new OBJSELHandler( );
    objsel.attachServer( oCore.hmi );
}
    Mouse Handler Example
mouse =
MOUSEHandler( oCore.hmi.checkHandler( MOUSEHandler.HTYPE ) );
if ( mouse == null ) {
    mouse = new MOUSEHandler( );
    mouse.attachServer( oCore.hmi );
    DVD Handler Example
dvd = DVDHandler( oCore.hmi.checkHandler( DVDHandler.HTYPE ) );
if ( dvd== null ) {
    dvd = new DVDHandler( );
    dvd.attachServer( oCore.hmi );
}
```

With the handlers attached to the movie clip application server 725, applications 715 and 720 may communicate with the corresponding components of the operating system. In FIG. 7, the handlers communicate with movie clip application server 725, which communicates with the operating system server 730 over a software communication link 770. The operating system server 730 communicates information to and from the respective component.

Communications between the movie clip application server 725 and the operating system application server 730 may be based on an XML protocol. The communications from the movie clip application server 725 to the operating system server 730 may have the following format:

```
<qcomp
name="component_name"><t>type</t><a>action
</a><p><arg0>arg0</arg0><arg1>arg1</arg1>
....<argN>argN</argN></p></qcomp>
```

In this format, the component_name may identify the target component for the message. The xml string between <qcomp> . . . </qcomp> may be passed to the component for processing. The type and action may be used to identify the command that the component is to perform. For example, the object selection handler 740 may send <t>char</t><a>c</a> (corresponding to selection of a letter "c" on a keyboard) to the movie clip application server 725 which, in turn, incorporates this type and action into the XML protocol format for transmission to the operating system server 730. The operating system server 730 may strip any unneeded information from the transmission before the information is sent to object selection component 745 for execution. The <arg0> . . . </argN> between <p> and </p> may be used to pass arguments to a component for processing. These parameters may be used by the mouse handler 750 to pass mouse movement information to the mouse component 755.

The movie clip application server 725 may send one message at a time to the operating system server 730. It may wait for an acknowledgment from the operating system server 730 before sending another message. The acknowledgment from the operating system server 730 may have the following format;

```
<qcomp><ack></ack></qcomp>
```

A component may send a message back to the corresponding handler using communications from the operating system server 730 to the movie clip application server 725 over link 770. The message may include data, an event, or similar information. Communications from the operating system server 730 to the movie clip application server 725 may have the following format:

```
<qcomp
name="component_name"><t>type</t><a>action
</a><p>any_xml_formated_data</p>
</qcomp>
```

The methods and descriptions described above may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment and/or controller of a vehicle or types of non-volatile or volatile memory remote from or resident to a detector. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system, apparatus, device, resident to a vehicle or a hands-free system communication system or audio system. Alternatively, the software may be embodied in media players (including portable media players) and/or recorders, audio visual or public address systems, desktop computing systems, etc. Such a system may include a computer-based system, a processor-containing system that includes an input and output interface that may communicate with an automotive or wireless communication bus through any hardwired or wireless automotive communication protocol or other hardwired or wireless communication protocols to a local or remote destination or server.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electro-magnetic, infrared, or semiconductor system, apparatus, device, or propagation medium. A non-exhaustive list of examples of a machine-readable medium may include: an electrical or tangible connection having one or more wires, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
    a processor;
    a touchscreen display interacting with the processor;
    an interface application executable by the processor to control the touchscreen display, the interface application controlling the touchscreen display to provide a container and a user interface control, the interface application adapted to compare a magnitude of motion of a gesture across a portion of the touchscreen display in the area of the container with a threshold value, the interface application adapted to determine whether the gesture is in an area of the container proximate the user interface control when the comparison indicates that the magnitude of motion of the gesture does not exceed the threshold value, the interface application including a mouse gesture handler that interprets the gesture as a mouse movement when the comparison indicates that the magnitude of motion of the gesture exceeds the threshold value; and
    a mouse gesture component adapted to communicate with the mouse gesture handler of the interface application and execute mouse gestures identified by the mouse gesture handler.

2. The system of claim 1, where the interface application comprises a movie clip based application.

3. The system of claim 2, where the interface application comprises:
    a movie clip based application server;
    an object selection handler in communication with the movie clip based application server; and
    wherein the mouse gesture handler is in communication with the movie clip application server.

4. The system of claim 3, further comprising an operating system executable by the processor, where the operating system comprises:
    an operating system application server in communication with movie clip based application server;
    an object selection component in communication with the operating system application server and adapted to communicate with the object selection handler of the interface application through communications between the operating system application server and the movie clip application server to handle object selections identified by the object selection handler; and
    wherein the mouse gesture component is in communication with the operating system application server and communicates with the mouse gesture handler of the interface application through communications between the operating system application server and the movie clip application server.

5. The system of claim 4, where the movie clip based application server and the operating system application server communicate with one another using an XML communication format.

6. The system of claim 1, where the container and user interface control are disposed on different layers of a multi-layer display arrangement.

7. The system of claim 6, where the user interface control comprises a plurality of user interface controls including keyboard characters.

8. The system of claim 7, and further comprising an operating system executable by the processor, where the operating system is responsive to selection of the keyboard characters as identified by the interface application to execute text entry functions corresponding to the selection of the keyboard characters, and where the operating system is responsive to mouse movement interpretation by the interface application to execute a mouse movement function.

9. The system of claim 6, where the user interface control comprises a plurality of user interface controls disposed on different layers of a multilayer display arrangement, and where the interface application executes a hierarchical search of the layers to determine which of the plurality of user controls is selected through manipulation of the touchscreen display in a given area of the container.

10. A system comprising:
    an interface application executable to control a touchscreen display to provide a container and a user interface control, where the interface application detects a gesture across a portion of the touchscreen display and compares a magnitude of motion of the gesture with a threshold value, where the interface application determines whether the gesture is a selection of the user interface control when the comparison indicates that the magnitude of motion of the gesture does not exceed the threshold value, and where the interface application identifies the gesture as a mouse movement gesture when the comparison indicates that the magnitude of motion of the gesture exceeds the threshold value;
    a first application responsive to the selection of the user interface control as identified by the interface application to execute a function corresponding to selection of the user interface control; and
    a second application responsive to the mouse movement gesture as identified by the interface application to execute a mouse motion corresponding to the identified mouse movement gesture;
    where the container and user control are disposed on different layers of a multiple layer display arrangement, the multiple layers displayed simultaneously.

11. The system of claim 10, where the interface application comprises a movie clip based application.

12. The system of claim 11, where the interface application comprises:
    a movie clip based application server;
    an object selection handler in communication with the movie clip application server; and
    a mouse gesture handler in communication with the movie clip application server.

13. The system of claim 12, further comprising an operating system executable by the processor, where the first and second applications are implemented in the operating system and comprise:

an operating system application server in communication with movie clip based application server;

an object selection component in communication with the operating system application server and adapted to communicate with the object selection handler of the interface application through communications between the operating system application server and the movie clip application server to handle object selections identified by the object selection handler; and a mouse gesture component in communication with the operating system application server and adapted to communicate with the mouse gesture handler of the interface application through communications between the operating system application server and the movie clip application server to handle mouse gestures identified by the mouse gesture handler.

14. The system of claim 13, where the movie clip based application server and the operating system application server communicate with one another using an XML communication format.

15. The system of claim 10, where the first and second applications are included in an operating system.

16. The system of claim 10, where the first and second applications are included in a single user application.

17. The system of claim 10, where the user control comprises a plurality of user controls, and where the plurality of user controls includes keyboard characters.

18. The system of claim 17, and further comprising an operating system executable by the processor, where the operating system is responsive to selection of the keyboard characters to execute text entry functions corresponding to the selection of the keyboard characters, and where the operating system is responsive to mouse movement identification to execute a mouse movement function corresponding to the gesture.

19. The system of claim 10, where the user control comprises a plurality of user controls disposed on different layers of the multiple layer display arrangement, and where the interface application executes a hierarchical search of the multiple layers to determine which of the plurality of user controls is selected through manipulation of the touchscreen display in a given area of the container.

20. A method of providing a user interface comprising:
generating a container and one or more selectable objects on a touchscreen display;
detecting a gesture across a portion of the touchscreen display;
determining whether a magnitude of motion of the gesture exceeds a non-zero movement threshold value;
executing a mouse movement on the touchscreen display corresponding to the gesture if the magnitude of motion of the gesture exceeds the movement threshold value;
determining whether the gesture is in an active area proximate at least one of the one or more selectable objects if the magnitude of motion of the gesture does not exceed the movement threshold value; and
executing a function associated with the selection of the at least one of the one or more selectable objects if the gesture is in the area of the at least one of the one or more selectable objects and the magnitude of motion of the gesture does not exceed the movement threshold value.

21. The method of claim 20, where the generating comprises:
generating the container on a first display layer of a multilayer display arrangement; and
generating a selectable object on a second display layer of the multilayer display arrangement.

22. The method of claim 20, where the generating comprises:
generating the container on a display layer of a multilayer display arrangement; and
generating a plurality of selectable objects on one or more further display layers of the multilayer display arrangement, where the plurality of selectable objects includes a plurality of keyboard characters.

23. The method of claim 22, further comprising:
generating a text area on the touchscreen display; and
displaying selected keyboard characters in the text area of the touchscreen display.

24. The method of claim 20, where the generating comprises generating a container and one or more selectable objects on the touchscreen display using a movie clip based application.

25. A method of providing a user interface comprising:
detecting a gesture across a portion of a touchscreen display;
comparing a magnitude of movement of the gesture to a movement threshold value to determine whether the magnitude of movement of the gesture exceeds the movement threshold value;
when the comparison indicates that the magnitude of movement of the gesture exceeds the threshold value, executing a mouse movement on the touchscreen display corresponding to the gesture;
when the comparison indicates that the magnitude of movement of the gesture does not exceed the threshold value,
identifying a selectable object;
determining whether the gesture is in an area proximate the selectable object; and
executing a function associated with the selectable object if the determination indicates the gesture is in the area proximate the selectable object.

26. A method of providing a user interface comprising:
detecting a movement across a portion of a touchscreen display in which the movement on the touchscreen display is linked to the movement of a pointing device, but not to the location of the pointing device;
comparing a magnitude of the movement of the pointing device to a movement threshold level to determine whether the magnitude of the movement across the portion of the touchscreen display exceeds the movement threshold level;
moving an indicator about the touchscreen display that corresponds to the movement of the pointing device when the comparison of the magnitude of the movement of the pointing device exceeds the movement threshold level;
determining whether the movement across a portion of the touchscreen display is within a proximate area of a selectable touchscreen object automatically when the magnitude of the movement of the pointing device does not exceed the movement threshold level; and
executing a function associated with the selectable touchscreen object when the magnitude of the movement of the pointing device does not exceed the movement threshold level and when the movement across a portion of a touchscreen display is within the proximate area of the selectable touchscreen object;
where the execution of the function associated with the touchscreen object occurs automatically in response to the determination that the movement across the portion of the touchscreen display is within the proximate area of the selectable touchscreen object.

* * * * *